(12) United States Patent
Kawakami et al.

(10) Patent No.: US 11,760,903 B2
(45) Date of Patent: Sep. 19, 2023

(54) ADHESIVE COMPOSITION, COVERING SUBSTRATE, AND CURED PRODUCT

(71) Applicant: Shin-Etsu Chemical Co., Ltd., Tokyo (JP)

(72) Inventors: Masato Kawakami, Joetsu (JP); Ayumu Kiyomori, Joetsu (JP); Koichi Nakazawa, Joetsu (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 88 days.

(21) Appl. No.: 17/225,642

(22) Filed: Apr. 8, 2021

(65) Prior Publication Data
US 2021/0332265 A1 Oct. 28, 2021

(30) Foreign Application Priority Data
Apr. 22, 2020 (JP) .................. 2020-075977

(51) Int. Cl.
C09J 4/00 (2006.01)
C07F 7/08 (2006.01)
C07F 7/10 (2006.01)

(52) U.S. Cl.
CPC .............. C09J 4/00 (2013.01); C07F 7/08 (2013.01); C07F 7/0807 (2013.01); C07F 7/0834 (2013.01); C07F 7/10 (2013.01); C09J 2301/408 (2020.08)

(58) Field of Classification Search
CPC .................... C08K 5/5419; C08K 5/5445
See application file for complete search history.

(56) References Cited

U.S. PATENT DOCUMENTS

2016/0185980 A1   6/2016   Margaillan et al.

FOREIGN PATENT DOCUMENTS

| JP | 8-143689 A | | 6/1996 |
|---|---|---|---|
| JP | 8-170051 A | | 7/1996 |
| JP | 2015-10223 A | | 1/2015 |
| WO | WO 94/03529 | * | 2/1994 |
| WO | WO 2019/084773 | * | 5/2019 |

* cited by examiner

*Primary Examiner* — Marc S Zimmer
(74) *Attorney, Agent, or Firm* — Birch, Stewart, Kolasch & Birch, LLP

(57) ABSTRACT

The adhesive composition includes: a cyclic organosilazane compound of the following general formula (1):

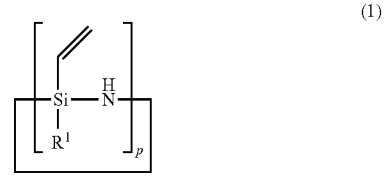

(1)

wherein $R^1$s each independently represent a substituted or unsubstituted monovalent hydrocarbon group having 1 to 10 carbon atoms, and p represents an integer of 3 to 8; and a hydrolyzable group-containing organosilicon compound containing an alkoxysilane compound of the following general formula (2) and/or a partial hydrolytic condensate thereof:

$$R^2_x\text{—}Si(OR^3)_{4-x} \quad (2)$$

wherein $R^2$ represents an unsubstituted monovalent hydrocarbon group having 1 to 10 carbon atoms and optionally having an oxygen atom, $R^3$ represents an unsubstituted monovalent hydrocarbon group having 1 to 10 carbon atoms, and x represents an integer of 0 to 2.

6 Claims, No Drawings

ADHESIVE COMPOSITION, COVERING SUBSTRATE, AND CURED PRODUCT

CROSS-REFERENCE TO RELATED APPLICATION

This non-provisional application claims priority under 35 U.S.C. §119(a) on Patent Application No. 2020-075977 filed in Japan on Apr. 22, 2020, the entire contents of which are hereby incorporated by reference.

TECHNICAL FIELD

The present invention relates to an adhesive composition, a covering substrate having a film formed from the composition, and a cured product of the composition.

BACKGROUND ART

Alkoxysilanes, silicone oligomers and silicone resins (hereinafter, also referred to as "condensation-curable silicone compounds") are condensation-curable compounds which have Si—OR (R is a monovalent hydrocarbon group) or Si—OH in the molecule and which can form a cured film by repetition of dealcoholization condensation and dehydration condensation.

It is known that the cured film derived from this condensation-curable silicone compound exhibits heat resistance, water resistance, weather resistance and flame retardancy as well as adhesion to inorganic materials such as glass and metal. Si—OH present in the condensation-curable silicone compound or generated by hydrolysis of Si—OR can be condensed with M-OH (M is an inorganic substance) on a surface of an inorganic material to form a Si—O-M bond. This is considered as the reason why a cured film of a condensation-curable silicone compound exhibits good adhesion to an inorganic material.

In order to maintain performance of a cured film for a long period of time, it is important that the cured film firmly adheres to an object to be treated. If the adhesion is poor, or a cured film is simply placed on the surface of the object to be treated, the cured film easily peels off and falls from the object to be treated due to physical contact or the like, so that a desired effect is lost.

In general, a (poly)silazane compound having a Si—N bond rather than Si—OR' (R' is a hydrogen atom or a monovalent hydrocarbon group) is more reactive than reactive functional groups on the surface of a substrate. Thus, with utilization of this characteristic, various compositions using polysilazane compounds have been developed (Patent Documents 1 to 3).

Patent Document 1 reports that a cured film formed of perhydropolysilazane exhibits good adhesion to a polyimide resin which is an organic material.

Patent Document 2 reports that a composition formed of perhydropolysilazane and metal powder exhibits good adhesion to a SUS substrate.

Patent Document 3 reports that a composition formed of an organopolysilazane compound having an amino group and a dimethylsiloxane compound exhibits good adhesion to a glass slide.

CITATION LIST

Patent Document 1: JP-A H08-143689
Patent Document 2: JP-A H08-170051
Patent Document 3: JP-A 2015-010223

SUMMARY OF THE INVENTION

Condensation-curable silicone compounds are thought to exhibit adhesion to inorganic materials by a mechanism as described above. When the amount of (M-OH) on the surface of an inorganic material is small or when reactivity is low; however, a covalent bond cannot be formed, and thus adhesion does not occur. In addition, since an organic material such as a plastic resin does not have a reactive hydroxy group on the surface of the material, the condensation-curable silicone compound cannot form a covalent bond by the above-described mechanism, and thus does not exhibit adhesion.

The composition of Patent Document 1 requires a high temperature condition of 200° C. for forming a cured film, so that a dedicated apparatus is needed for carrying out operations outdoors etc., leading to poor workability.

For the composition of Patent Document 2, a high temperature condition is used for forming a cured film, and there is the same problem as in Patent Document 1.

The composition of Patent Document 3 has adhesion to a glass slide to which the composition easily adheres, but adhesion of the composition to an organic material is unknown.

The present invention has been made in view of the above-described circumstances, and an object of the present invention is to provide an adhesive composition exhibiting good adhesion to various substrates, a covering substrate having a film formed from the composition, and a cured product of the composition.

The present inventors have extensively conducted studies for solving the above-described problems, and resultantly found that an adhesive composition containing a silazane compound having a specific structure and a hydrolyzable group-containing silicone compound exhibits good adhesion even to a substrate to which a hydrolyzable group-containing silicone compound alone has not adhered, and in particular, the adhesive composition can adhere to an organic material, leading to completion of the present invention.

Specifically, the present invention provides:
1. An adhesive composition including: a cyclic organosilazane compound of the following general formula (1):

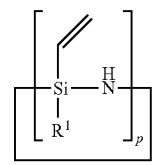

wherein $R^1$s each independently represent a substituted or unsubstituted monovalent hydrocarbon group having 1 to 10 carbon atoms, and p represents an integer of 3 to 8; and
a hydrolyzable group-containing organosilicon compound containing an alkoxysilane compound of the following general formula (2) and/or a partial hydrolytic condensate thereof:

$$R^2_x\text{—Si}(OR^3)_{4-x} \qquad (2)$$

wherein $R^2$ represents an unsubstituted monovalent hydrocarbon group having 1 to 10 carbon atoms and optionally having an oxygen atom, $R^3$ represents an unsubstituted monovalent hydrocarbon group having 1 to 10 carbon atoms, and x represents an integer of 0 to 2;
2. The adhesive composition according to 1, further including a bisalkoxysilane compound of the following general formula (3) or a partial hydrolytic condensate thereof:

$$R^4_n(OR^5)_{3-n}\text{—Si—}R^6\text{—SiR}^4_m(OR^5)_{3-m} \qquad (3)$$

wherein $R^4$ and $R^5$ each independently represent a substituted or unsubstituted monovalent hydrocarbon group having 1 to 10 carbon atoms, $R^6$ represents a substituted or unsubstituted divalent hydrocarbon group having 1 to 50 carbon atoms and optionally containing O, S, N or Si, and n and m each independently represent 0, 1 or 2;

3. The adhesive composition according to 1 or 2, further including a solvent;

4. The adhesive composition according to any one of 1 to 3, wherein the solvent is an isoparaffin compound or a silicone compound having 2 to 8 silicon atoms;

5. The adhesive composition according to any one of 1 to 4, further including at least one selected from the group consisting of titanium, aluminum, zinc and tin;

6. A cured product obtained by curing the adhesive composition according to any one of 1 to 5;

7. A covering substrate including a substrate, and a film formed on the substrate, the film being formed from the adhesive composition according to any one of 1 to 5; and 8. The covering substrate according to 7, wherein the substrate is an acrylic resin.

ADVANTAGEOUS EFFECTS OF INVENTION

The adhesive composition of the present invention exhibits good adhesion even to a substrate to which a hydrolyzable group-containing organosilicon compound alone does not adhere.

DESCRIPTION OF THE PREFERRED EMBODIMENT

Hereinafter, the present invention is described in detail.

[1] Adhesive Composition

The adhesive composition of the present invention includes a cyclic organosilazane compound of the following general formula (1) (hereinafter, referred to as a cyclic organosilazane compound (1)), and a hydrolyzable group-containing organosilicon compound containing an alkoxysilane compound of the following general formula (2) (hereinafter, referred to as an alkoxysilane compound (2)) and/or a partial hydrolytic condensate thereof

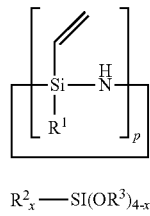

(1)

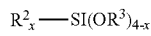

(2)

$R^2_x$—SI(OR$^3$)$_{4-x}$

In the above general formula (1), $R^1$s independently represent a substituted or unsubstituted monovalent hydrocarbon group having 1 to 10 carbon atoms, preferably 1 to 6 carbon atoms.

Specific examples of the monovalent hydrocarbon group of $R^1$ include linear alkyl groups having 1 to 10 carbon atoms, preferably 1 to 6 carbon atoms, such as methyl, ethyl, n-propyl, n-butyl, n-pentyl, n-hexyl, n-heptyl, n-octyl and decyl groups; branched alkyl groups having 3 to 10 carbon atoms, preferably 3 to 8 carbon atoms, such as isopropyl, isobutyl, sec-butyl, tert-butyl, neopentyl, texyl and 2-ethylhexyl groups; cyclic alkyl groups having 3 to 10 carbon atoms, preferably 5 to 6 carbon atoms, such as cyclopentyl and cyclohexyl groups; alkenyl groups having 2 to 10, preferably 2 to 5 carbon atoms, such as vinyl, allyl(2-propenyl), 1-propenyl, butenyl and pentenyl groups; aryl groups having 6 to 10 carbon atoms, preferably 6 to 7 carbon atoms, such as phenyl and tolyl groups; and aralkyl groups having 7 to 10 carbon atoms, preferably 7 to 8 carbon atoms, such as benzyl and phenetyl groups.

The monovalent hydrocarbon group of IV may be substituted with other substituents such as fluorine atoms at some or all of hydrogen atoms of the monovalent hydrocarbon group. Specific examples of the monovalent hydrocarbon group substituted with fluorine atoms include fluoroalkyl groups such as 3,3,3-trifluoropropyl, 3,3,4,4,5,5,6,6,6-nonafluorohexyl and 3,3,4,4,5,5,6,6,7,7,8,8,8-tridecafluorooctyl groups.

In addition, p is an integer of 3 to 8, preferably 3 to 6, more preferably 3 or 4, still more preferably 3.

In the above-described adhesive composition, the cyclic organosilazane compounds (1) may be used alone or used in combination of two or more thereof. In addition, as the combination here, a combination of cyclic organosilazane compounds (1) different in $R^1$, different in p or different in both IV and p may be used.

In the general formula (2), $R^2$ represents an unsubstituted monovalent hydrocarbon group having 1 to 10 carbon atoms, preferably 1 to 6 carbon atoms, and optionally containing an oxygen atom, $R^3$ is an unsubstituted monovalent hydrocarbon group having 1 to 10 carbon atoms, preferably 1 to 6 carbon atoms, and x represents an integer of 0 to 2.

Specific examples of the monovalent hydrocarbon group of $R^2$ and $R^3$ include substituents similar to those in $R^1$.

Specific examples of the monovalent hydrocarbon group when $R^2$ contains an oxygen atom include alkyloxyalkyl groups such as methoxymethyl, ethoxymethyl and methoxypropyl groups.

Specific examples of the alkoxysilane compound (2) include dialkyldialkoxysilane compounds such as dimethyldimethoxysilane, dimethyldiethoxysilane, diphenyldimethoxysilane, diphenyldiethoxysilane and dicyclopentyldimethoxysilane; and alkyltrialkoxysilanes such as methyltrimethoxysilane, methyltriethoxysilane, ethyltrimethoxysilane, ethyltriethoxysilane, propyltrimethoxysilane, propyltriethoxysilane, hexyltrimethoxysilane, hexyltriethoxysilane, octyltrimethoxysilane, octyltriethoxysilane, decyltrimethoxysilane, decyltriethoxysilane, methoxymethyltrimethoxysilane, ethoxymethyltriethoxysilane, phenyltrimethoxysilane and phenyltriethoxysilane.

The partial hydrolysis condensation of the alkoxysilane compound (2) can be performed by adding water to the alkoxysilane compound (2) in the presence of a catalyst, heating the mixture as necessary, and stirring the mixture. Here, the alkoxysilane compounds (2) may be used alone or used in combination of two or more thereof.

The hydrolysis condensation causes production of a corresponding alcohol, and with the alcohol removed by distillation if necessary, a hydrolyzable group-containing silicone compound which is a partial hydrolytic condensate can be obtained.

The amount of water used in the hydrolysis condensation reaction is not particularly limited, and is preferably 0.3 to 1 mol, more preferably 0.4 to 0.7 mol per 1 mol of the alkoxysilane compound (2).

When water is added, the water may be added as a mixture with a protic polar solvent such as methanol or ethanol, or an aprotic polar solvent such as acetonitrile, tetrahydrofuran or dimethylformamide.

The catalyst used for the hydrolysis condensation reaction is not particularly limited, and examples thereof include acidic compounds such as hydrogen chloride, hydrogen bromide, hydrogen iodide, nitric acid, sulfuric acid, acetic acid and methanesulfonic acid; basic compounds such as ammonia, sodium hydroxide and potassium hydroxide; salts of weak acids and strong bases such as sodium acetate; salts of strong acids and weak bases such as ammonium sulfate; and metal compounds such as tin compounds, titanium compounds and aluminum compounds. These catalysts may be used alone or used in combination of two or more thereof.

The reaction temperature in the hydrolysis condensation reaction is not particularly limited, and is preferably 0 to 100° C., more preferably 23 to 70° C.

In the above-described adhesive composition, the alkoxysilane compound (2) may be used as it is or a partial hydrolytic condensate of the alkoxysilane compound (2) may be used as the hydrolyzable group-containing organosilicon compound. In addition, a mixture of the alkoxysilane compound (2) and the partial hydrolytic condensate may be used.

The compounding ratio of the cyclic organosilazane compound (1) to the hydrolyzable group-containing organosilicon compound in the adhesive composition is not particularly limited, and the amount of the cyclic organosilazane compound (1) is preferably 10 to 90 wt %, more preferably 20 to 80 wt %, still more preferably 30 to 70 wt % per the total weight of the cyclic organosilazane compound (1) and the hydrolyzable group-containing organosilicon compound.

The adhesive composition may further contain a bisalkoxysilane compound of the following general formula (3) (hereinafter, referred to as bisalkoxysilane compound (3)) or a partial hydrolytic condensate thereof.

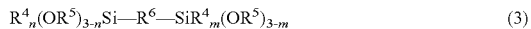
$$R^4{}_n(OR^5)_{3-n}Si—R^6—SiR^4{}_m(OR^5)_{3-m} \quad (3)$$

In the above general formula (3), $R^4$ and $R^5$ each represent the same meaning as $R^1$.

$R^6$ represents a substituted or unsubstituted divalent hydrocarbon group having 1 to 50, preferably 1 to 20, more preferably 1 to 8 carbon atoms and optionally containing O, S, N or Si.

m and n each independently represent an integer of 0, 1 or 2.

Specific examples of the divalent hydrocarbon group of $R^6$ include linear alkylene groups having 1 to 10 carbon atoms, preferably 1 to 6 carbon atoms, such as methylene, ethylene, trimethylene, tetramethylene, hexamethylene, octamethylene and decylene groups;

branched alkylene groups having 3 to 10 carbon atoms, preferably 3 to 6 carbon atoms, such as propylene (methylethylene) and methyltrimethylene groups; cyclic alkylene groups having 3 to 10 carbon atoms, preferably 6 to 10 carbon atoms, such as cyclohexylene and methylenecyclohexylene groups; alkenylene groups having 2 to 10 carbon atoms, preferably 2 to 5 carbon atoms, such as propenylene, butenylene, hexenylene and octenylene groups; and arylene groups having 6 to 10 carbon atoms, preferably 6 to 7 carbon atoms, such as a phenylene group; and aralkylene groups having 7 to 10 carbon atoms, preferably 7 to 8 carbon atoms, such as methylenephenylene and methylenephenylenemethylene groups.

Specific examples of the divalent hydrocarbon group containing O, S, N or Si of $R^6$ include oxyalkylene, alkyleneoxyalkylene, thioalkylene, alkylenethioalkylene, aminoalkylene, alkyleneaminoalkylene, dialkylsilylalkylene and alkylenedialkylsilylalkylene groups, and examples of these alkylene groups include substituents similar to the alkylene groups each independently listed as the linear, branched or cyclic alkylene group of $R^6$.

In addition, $R^6$ may contain an organopolysiloxane structure of the following general formula (4).

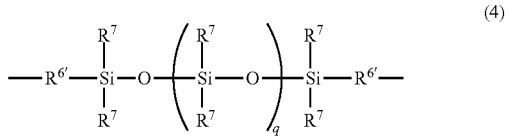

$$(4)$$

wherein $R^{6'}$ represents the same meaning as $R^6$ above.

In the above general formula (4), $R^7$ is an independently substituted or unsubstituted monovalent hydrocarbon group having 1 to 6 carbon atoms, preferably 1 to 3 carbon atoms. Specific examples of the monovalent hydrocarbon group include substituents similar to those in $R^1$.

q represents an integer of 0 to 20, preferably 0 to 15, more preferably 0 to 8.

The divalent hydrocarbon group of $R^6$ may be substituted with other substituents such as fluorine atoms at some or all of hydrogen atoms of the monovalent hydrocarbon group. Specific examples of the divalent hydrocarbon group substituted with a fluorine atom include alkylene fluoroalkylene alkylene groups such as ethylene tetrafluoroethylene ethylene, ethylene hexafluoropropylene ethylene, ethylene octafluorobutylene ethylene, ethylene hexadecafluorohexylene ethylene, propylene octafluorobutylene propylene, propylene hexadecafluorohexylene propylene, hexylene octafluorobutylene hexylene and hexylene hexadecafluorohexylene hexylene.

Specific examples of the bisalkoxysilane compound (3) include 1,2-bis(trimethoxysilyl)ethane, 1,2-bis(methyldimethoxysilyl)ethane, 1,2-bis(dimethylmethoxysilyl)ethane, 1-(trimethoxysilyl)-2-(methyldimethoxysilyl)ethane, 1-(trimethoxysilyl)-2-(dimethylmethoxysilyl)ethane, 1,6-bis(trimethoxysilyl)hexane, 1,6-bis(triethoxysilyl)hexane, 1,8-bis(trimethoxysilyl)octane, 1,8-bis(triethoxysilyl)octane, bis(trimethoxysilylpropyl)ether, bis(triethoxysilylpropyl)ether, bis(trimethoxysilylpropyl)sulfide, bis(triethoxysilylpropyl)sulfide, bis(trimethoxysilylpropyl)amine, bis(triethoxysilylpropyl)amine, 1,3-bis(trimethoxysilylethyl)-1,1,3,3-tetramethyldisiloxane, 1,3-bis(triethoxysilylethyl)-1,1,3,3-tetramethyldisiloxane, 1,9-bis(trimethoxysilylethyl)-1,1,3,3,5,5,7,7,9,9-decamethylpentasiloxane, α,ω-bis(trimethoxysilylethyl)-polymethylpolysiloxane, 1,4-bis(trimethoxysiloxydimethylsilyl)benzene, 1,4-bis(trimethoxysilylethyl)benzene and 1,4-bis(trimethoxysilylethyldimethylsilyl)benzene.

Specific examples of the bisalkoxysilane compound (3) substituted with fluorine at some or all of the divalent hydrocarbon groups of $R^6$ include bisalkoxysilylfluoroalkane compounds such as 1,6-bis(trimethoxysilyl)-3,3,4,4-tetrafluorohexane, 1,6-bis(triethoxysilyl)-3,3,4,4-tetrafluorohexane, 1,8-bis(trimethoxysilyl)-3,3,4,4,5,5,6,6-octafluorooctane and 1,8-bis(triethoxysilyl)-3,3,4,4,5,5,6,6-octafluorooctane.

When R⁶ of the above general formula (3) is an alkyleneaminoalkylene group, alkoxysilane compounds of the following general formula (5) are preferable in which a corresponding amino group or an alcohol substituted with the amino group form a ring structure with an organoxysilyl group in the bisalkoxysilane compound (3) (hereinafter, also referred to as a bisalkoxysilane compound (5)).

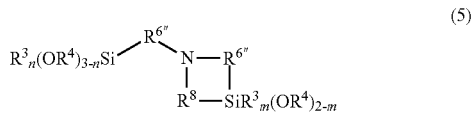
(5)

wherein R³, R⁴, m and n represent the same meaning as described above, and R⁶″ represents the same meaning as R⁶ above.

In the general formula (5), R⁸ represents a single bond or a divalent hydrocarbon group having 2 to 10 carbon atoms and substituted with —O—, —S—, —NH— or —C(=O)O— at a Si atom-side terminal group, and is preferably a single bond from the viewpoint of reactivity.

Examples of the divalent hydrocarbon group having 2 to 10 carbon atoms include substituents similar to the substituents exemplified in R⁶ above.

Specific examples of the bisalkoxysilane compound (5) include 2,2-dimethoxy-1-(3-trimethoxysilylpropyl)-1-aza-2-silacyclopentane and 2,2-dimethoxy-6-(3-trimethoxysilylpropyl)-6-aza-1-silacyclooctane, 2,2-dimethoxy-6-(3-trimethoxysilylpropyl)-8-methyl-6-aza-1-silacyclooctane.

In addition, the adhesive composition may further contain a partial hydrolytic condensate of the bisalkoxysilane compound (3). The partial hydrolytic condensate can be obtained by the same method as the hydrolysis condensation of the alkoxysilane compound (2).

When the bisalkoxysilane compound (3) and/or a partial hydrolytic condensate thereof is used in the adhesive composition, the content thereof is not particularly limited, and is preferably 1 to 100 wt %, more preferably 5 to 20 wt % per the total weight of the cyclic organosilazane compound (1) and the hydrolyzable group-containing silicone compounds.

The adhesive composition can be used without a solvent, but a solvent may be used.

Specific examples of the solvent include aliphatic hydrocarbon compounds having 5 to 20 carbon atoms, such as pentane, hexane, cyclohexane, octane, isooctane, nonane, decane, dodecane and isododecane; aromatic hydrocarbon compounds having 6 to 10 carbon atoms, such as benzene, toluene and xylene; ether compounds such as diethyl ether, tetrahydrofuran, 4-methyltetrahydrofuran, cyclopentylmethyl ether and dioxane; ester compounds such as ethyl acetate, isopropyl acetate and butyl acetate; aprotic polar compounds such as acetonitrile, N,N-dimethylformamide; chlorinated hydrocarbon compounds such as dichloromethane and chloroform; siloxane compounds having 2 to 10 silicon atoms, such as hexamethyldisiloxane, tris(trimethylsiloxy)methylsilane, octamethylcyclotetrasiloxane and decamethylcyclopentasiloxane. These solvents may be used alone or used in combination of two or more thereof Of these, aliphatic hydrocarbon compounds having 8 to 12 carbon atoms and siloxane compounds having 2 to 8 silicon atoms are particularly preferable from the viewpoint of safety.

The amount of the solvent used is not particularly limited, and is preferably an amount which ensures that the concentration of the cyclic organosilazane compound (1) and the hydrolyzable group-containing silicone compound is preferably 0.01 to 80 wt %, more preferably 1 to 60 wt %, still more preferably 5 to 50 wt %.

In addition, the adhesive composition may contain at least one metal compound selected from a titanium compound, an aluminum compound, a zinc compound and a tin compound as a curing catalyst.

Specific examples of the titanium compound include tetraalkyl orthotitanate such as tetrabutyl orthotitanate, tetramethyl orthotitanate, tetraethyl orthotitanate, tetrapropyl orthotitanate and tetraisopropyl orthotitanate, partial hydrolytic condensates thereof, and titanium acylates.

Specific examples of the aluminum compound include aluminum trihydroxide, aluminum alcoholates, aluminum acylates, salts of aluminum acylates, aluminosyloxy compounds and aluminum metal chelate compounds.

Specific examples of the zinc compound include zinc ocrylate and zinc 2-ethylhexanoate.

Specific examples of the tin compound include dioctyltin dioctate and dioctyltin dilaurate.

The amount of the metal compound used is not particularly limited, and is preferably 0.01 to 10 wt %, more preferably 0.1 to 5 wt % per the weight of the composition, from the viewpoint of exhibiting the effect of the catalyst.

The adhesive composition may contain one or more other additives selected from pigments, antifoaming agents, lubricants, preservatives, pH adjusters, film forming agents, antistatic agents, antibacterial agents, dyes and the like as long as the effects of the adhesive composition are not impaired.

The adhesive composition is prepared as follows. A hydrolyzable group-containing silicone compound containing the cyclic organosilazane compound (1), the alkoxysilane compound (2) and/or a partial hydrolytic condensate thereof is mixed with the bisalkoxysilane compound (3) or a partial hydrolytic condensate thereof, a solvent, a metal compound and additives if necessary while care is taken to prevent ingress of moisture, and the mixture is formed into a homogeneous solution. Specifically, when the components are handled in an atmosphere of an inert gas such as nitrogen or argon, ingress of moisture can be avoided.

The order of addition of the components is not limited, and it is preferable the metal compound is added last from the viewpoint of minimizing progression of hydrolysis.

[2] Cured Product and Covering Substrate

A cured product obtained by curing the adhesive composition and a covering substrate having a film obtained from the cured product and the adhesive composition are now described.

The adhesive composition usually reacts with moisture in the air and hardens to give a cured product. When the adhesive composition contains a solvent, the solvent may be volatilized before the composition is cured, or the composition may be cured while the solvent is volatilized.

Ordinary temperature or a temperature under heating can be employed as a temperature during curing. The temperature here is not particularly limited as long as the substrate is not adversely affected, and the temperature is typically 0 to 200° C., preferably 0 to 100° C., more preferably 25 to 50° C. for maintaining reactivity.

In addition, after the adhesive composition is applied to a surface of a substrate such as an inorganic material or an organic material, the adhesive composition is reacted with moisture in the air to be cured. A covering substrate having a film formed from the adhesive composition can be thus obtained.

Examples of the inorganic material include metal, glass, silica, alumina, talc, calcium carbonate and carbon.

As the glass, types of glass which are commonly used, such as E glass, C glass and quartz glass can be used, and glass fibers may be used. The glass fibers may be in the form of an aggregate of the glass fibers, for example, a glass-based (filament) fiber bundle having a fiber diameter of 3 to 30 μm, a twisted yarn, or a woven fabric.

Examples of the organic material include resin materials such as polyethylene, polypropylene, polystyrene, poly (meth)acryl, polyvinyl chloride, polycarbonate, nylon, polyurethane, polybutylene terephthalate, polyethylene terephthalate, ABS (polymer of acrylonitrile, butadiene and styrene), melamine, phenol, epoxy and polyimide; elastomers such as polybutadiene rubber, polyisopropylene rubber, nitrile rubber, neoprene rubber, polysulfide and urethane rubber; and rubber materials, and poly (meth)acryl is particularly preferable.

The shape of the substrate is not particularly limited, and may be a plate shape, a sheet shape, a fibrous shape or a powdered shape.

Examples of the method for applying the adhesive composition to the substrate include known application methods such as a brush coating method, a sponge coating method, a cloth coating method, a spray coating method, a wire bar method, a blade method, a roll coating method, a dipping method and a spin coating method.

In addition, for powdered materials such as silica, alumina, talc and calcium carbonate, a mixing method may be employed in which the adhesive composition is directly mixed together with the substrate by use of a mixer or a mill.

The obtained film exhibits adhesion to inorganic materials and organic materials. As a method for determining adhesion, the adhesion can be examined by a cross-cut test or a grid test specified in JIS Standards or the like.

EXAMPLES

Examples of Synthesis, Comparative Examples of Synthesis, Examples and Comparative Examples are given below to more concretely illustrate the invention, but the invention is not limited by these Examples.

Example of Synthesis 1

Production of cyclic organosilazane compound 1

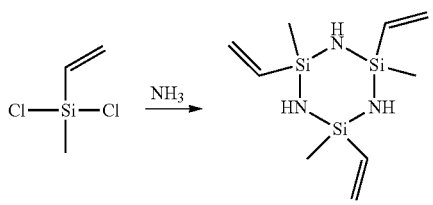

While the inside of a four-necked glass flask equipped with a stirrer, a gas feed tube, a thermometer and a reflux condenser was purged with nitrogen, so that nitrogen gas was sent to an open end of the upper part of the reflux condenser to prevent ingress of outside air, 84.7 g (0.600 mol) of vinylmethyldichlorosilane and 170 g of 2,2,4-trimethylpentane were added and stirred to obtain a homogeneous reaction solution. The reaction solution was cooled to 10° C. or lower, and ammonia gas was continuously fed into the reaction solution through a feed tube for 7 hours with the temperature of the reaction solution kept lower than 15° C. After leakage of ammonia from the top of the reactor was confirmed, the feeding of the ammonia was stopped. The reaction solution was filtered, and the filtration residue was washed with 2,2,4-trimethylpentane.

The obtained filtrate was concentrated and purified by distillation to obtain 29.4 g of 2,4,6-trimethyl-2,4,6-trivinyl-cyclotrisilazane (cyclic organosilazane compound 1) (yield: 57%) as a fraction of 100° C./1 kPa.

Example of Synthesis 2

Production of Cyclic Organosilazane Compound 2

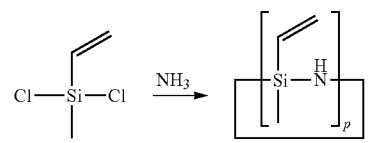

While the inside of a four-necked glass flask equipped with a stirrer, a gas feed tube, a thermometer and a reflux condenser was purged with nitrogen, so that nitrogen gas was sent to an open end of the upper part of the reflux condenser to prevent ingress of outside air, 212.5 g (1.506 mol) of vinylmethyldichlorosilane and 520 g of 2,2,4-trimethylpentane were added and stirred to obtain a homogeneous reaction solution. The reaction solution was cooled to 10° C. or lower, and ammonia gas was continuously fed into the reaction solution through a feed tube for 8 hours with the temperature of the reaction solution kept lower than 15° C. After leakage of ammonia from the top of the reactor was confirmed, the feeding of the ammonia was stopped. The reaction solution was filtered, and the filtration residue was washed with 2,2,4-trimethylpentane.

The obtained filtrate was concentrated to obtain 123.1g of a mixture of cyclic organosilazane compounds. The result of analysis by gas chromatography showed that a compound with p=3 was present at 81 wt %, a compound with p=4 was present at 16 wt %, a compound with p=5 was present at 2 wt %, and a compound with p=6 was present at 1 wt %.

Comparative Example of Synthesis 1

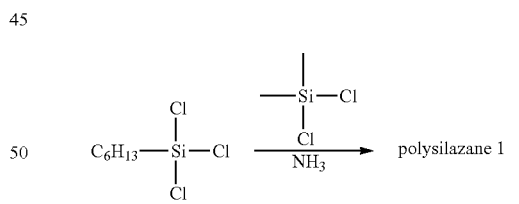

While the inside of a four-necked glass flask equipped with a stirrer, a gas feed tube, a thermometer and a reflux condenser was purged with nitrogen, so that nitrogen gas was sent to an open end of the upper part of the reflux condenser to prevent ingress of outside air, 148.3 g (0.675 mol) of hexyltrichlorosilane, 29.2 g (0.225 mol) of dimethyldichlorosilane and 700 g of cyclopentylmethyl ether as a solvent were added to obtain a homogeneous reaction solution. The solution was cooled to 10° C. or lower, and ammonia gas was continuously fed into the reaction solution through a feed tube for 7 hours with the temperature of the reaction solution kept lower than 30° C. Thereafter, the feeding of ammonia was stopped, and nitrogen gas was blown through the feed tube for 2 hours to purge the excess ammonia gas. The reaction solution was filtered, and ammonium chloride was removed to obtain polysilazane compound 1.

To this reaction solution, 105 g of an isoparaffin solvent was added to obtain 210.0 g of a colorless transparent solution composition (concentration: 50 wt %).

The obtained composition was subjected to IR analysis, and the result showed that a peak derived from a Si—N—Si structure was present at 922 cm$^{-1}$ and a peak derived from NH was present at 3,370 cm$^{-1}$. In addition, GPC analysis was performed under the following conditions, and the result showed that the weight average molecular weight was 2,700. This indicated that the target polysilazane 1 was produced.

Examples 1 to 10 and Comparative Examples 1 to 5

The compounds used in Examples and Comparative Examples are shown below.
(1) Organosilazane Compound
Cyclic organosilazane compound 1: Example of Synthesis 1
Cyclic organosilazane compound 2: Example of Synthesis 2
Polysilazane compound 1: Compound of the following formula and obtained in Comparative Example of Synthesis 1

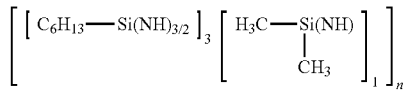

Polysilazane compound 2: HTA-150ORC (manufactured by SANWAKAGAKU CORP.) of the following formula

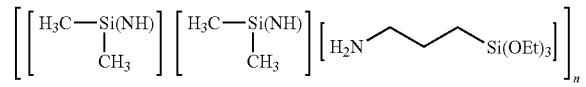

(2) Hydrolyzable Group-Containing Organosilicon
KC-895: $R^2$=methyl group and $R^3$ =methyl group (manufactured by Shin-Etsu Chemical Co., Ltd.)
KR-401N: $R^2$=methyl group or phenyl group; and $R^3$=methyl group (manufactured by Shin-Etsu Chemical Co., Ltd.)
X-40-9250: $R^2$=methyl group; and $R^3$=methyl group (manufactured by Shin-Etsu Chemical Co., Ltd.)
KR-510: $R^2$=methyl group or phenyl group; and $R^3$ =methyl group (manufactured by Shin-Etsu Chemical Co., Ltd.)
KR-400: $R^2$=methyl group; and $R^3$ =methyl group (metal compound internal addition type) (manufactured by Shin-Etsu Chemical Co., Ltd.)
KBM-13: $R^2$ =methyl group and $R^3$ =methyl group (manufactured by Shin-Etsu Chemical Co., Ltd., methyltrimethoxysilane)
(3) Bisalkoxysilane compound
Bisalkoxysilane compound 1: 1,8-bistrimethoxysilyloctane (the following formula)

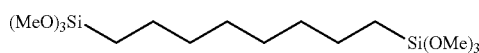

Bisalkoxysilane compound 2: 1,6-bistrimethoxysilylhexane (the following formula)

Bisalkoxysilane compound 3: 1,3-bis(trimethoxysilylethyl)-1,1,3,3-tetramethoxydisiloxane (the following formula)

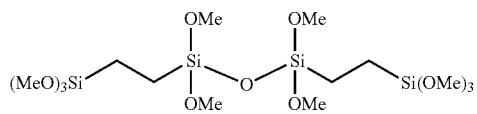

(4) Solvent
Solvent 1: Isoparaffin solvent (MERBEILLE 30 manufactured by TOA Oil Co., Ltd.)
Solvent 2: Silicone solvent (KF-96-1CS, manufactured by Shin-Etsu Chemical Co., Ltd.)
(5) Metal Compound
Metal compound 1: Alkoxy titanium compound (D-25, manufactured by Shin-Etsu Chemical Co., Ltd.)
Metal compound 2: Aluminum chelate compound (DX-9740 manufactured by Shin-Etsu Chemical Co., Ltd.)

A composition was prepared by mixing, in an atmosphere of nitrogen, an organosilazane compound and a hydrolyzable group-containing organosilicon compound, and a bisalkoxysilane compound, a solvent and a metal compound if necessary at a ratio as shown in Table 1 below so as to prevent ingress of moisture. The curability and adhesion of the compositions were evaluated as follows.

[Curing Test]

The prepared composition was applied onto a polished steel sheet (10 cm×15 cm) with a bar coater to a wet thickness of 30 μm, and then cured in an environment at 25° C. and 50% relative humidity. Thereafter, a finger was pressed against the coated surface of the test piece every 30 minutes, and the time until finger marks were no longer left (drying time by finger touch, tack free time) was measured, and evaluation was performed in accordance with the following criteria. The results are collectively shown in Table 1.

⊚: Finger marks are no longer left within less than 30 minutes.

○: Finger marks are no longer left within 30 minutes or more and less than 1 hour.

Δ: Finger marks are no longer left within 1 hour or more and less than 3 hours.

×: It takes 5 hours or more until finger marks are no longer left, or the composition is not cured.

[Adhesion Test]

The prepared composition was applied to each of an aluminum plate (A15052 manufactured by AS ONE Corporation), a SUS plate (SUS304 manufactured by AS ONE Corporation), and an acrylic plate (PMMA, manufactured by AS ONE Corporation) with a sponge, and then cured at 50° C. and 50% relative humidity for 2 hours. The obtained test piece was left standing at room temperature for 2 days, the prepared coating film was subjected to a cross-cut test (in accordance with JIS K 5600), and the degree of remaining of the coating film after peeling of the tape was evaluated in accordance with the following criteria. The results are collectively shown in Table 1.

⊚: Little coating film is peeled.
○: 70% or more of the coating film remains.
Δ: The residual ratio of the coating film is 30% or more and less than 70%.
×: The residual ratio of the coating film is less than 30%.

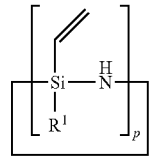

(1)

|  |  | Example | | | | | | | | | | | Comparative Example | | | | | |
|---|---|---|---|---|---|---|---|---|---|---|---|---|---|---|---|---|---|---|
|  |  | 1 | 2 | 3 | 4 | 5 | 6 | 7 | 8 | 9 | 10 | 11 | 1 | 2 | 3 | 4 | 5 | 6 |
| Organosilazane compound | Cyclic organosilazane compound 1 | 8 | 8 | 8 | 7.3 | 7.3 | 7.3 | 8 | 8 |  |  |  |  |  |  |  |  |  |
|  | Cyclic organosilazane compound 2 |  |  |  |  |  |  |  |  | 8 | 8 | 8 |  |  |  |  |  |  |
|  | Polysilazane compound 1 |  |  |  |  |  |  |  |  |  |  |  |  |  |  | 8 | 8 |  |
|  | Polysilazane compound 2 |  |  |  |  |  |  |  |  |  |  |  |  |  |  |  |  | 8 |
| Hydrolyzable group-containing organosilicon compound | KC-89S | 12 | 12 |  |  |  |  |  |  | 10.8 | 12 |  |  |  |  | 12 |  | 12 |
|  | KR-401N |  |  | 12 | 10.9 | 10.9 | 10.9 |  |  |  |  |  |  | 20 | 18 |  | 10.8 |  |
|  | X-40-9250 |  |  |  |  |  |  | 12 |  |  | 12 |  |  |  |  |  |  |  |
|  | KR-510 |  |  |  |  |  |  |  | 1.2 |  |  |  |  |  |  |  |  |  |
|  | KR-400 |  |  |  |  |  |  |  |  |  |  |  | 20 |  |  |  |  |  |
|  | KBM-13 |  |  |  |  |  |  |  |  |  |  | 12 |  |  |  |  |  |  |
| Bisalkoxysilane compound | Bisalkoxysilane compound 1 |  |  |  | 1.8 |  |  |  |  |  |  |  |  |  | 2 |  | 1.2 |  |
|  | Bisalkoxysilane compound 2 |  |  |  |  | 1.8 |  |  |  |  |  |  |  |  |  |  |  |  |
|  | Bisalkoxysilane compound 3 |  |  |  |  |  | 1.8 |  |  |  |  |  |  |  |  |  |  |  |
| Solvent | Solvent 1 |  |  | 80 | 80 | 80 | 80 |  |  |  |  |  |  | 80 | 80 | 80 | 80 |  |
|  | Solvent 2 | 80 | 80 |  |  |  |  | 80 | 80 | 80 | 80 | 80 | 80 |  |  |  |  | 80 |
| Metal compound | Metal compound 1 | 1 | 1 | 1 | 1 | 1 | 1 | 1 | 1 | 1 | 1 | 1 | Catalyst internaly added type | 1 | 1 | 1 | 1 |  |
|  | Metal compound 2 |  | 1 |  |  |  |  |  |  |  |  |  |  |  |  |  |  | 1 |
| Curability test |  | ○ | ○ | ○ | ⊚ | ⊚ | ⊚ | ○ | ○ | Δ | ○ | Δ | ○ | ○ | ⊚ | ○ | ○ | Δ |
| Adhesion test | Aluminum plate | ⊚ | ⊚ | ⊚ | ⊚ | ⊚ | ⊚ | ⊚ | ○ | ○ | ⊚ | ⊚ | ⊚ | ⊚ | ⊚ | ⊚ | ⊚ | ⊚ |
|  | SUS plate | ⊚ | ⊚ | ⊚ | ⊚ | ⊚ | ⊚ | ⊚ | ○ | ○ | ⊚ | ⊚ | × | × | × | ⊚ | ⊚ | ⊚ |
|  | Acrylic plate | ⊚ | ⊚ | ⊚ | ⊚ | ⊚ | ⊚ | ⊚ | ⊚ | ⊚ | ⊚ | ○ | × | × | × | × | × | × |

As shown in Table 1, the cyclic organosilazane-containing compounds obtained in Examples exhibit good adhesion to various substrates, and particularly good adhesion to polymethyl methacryl ate.

On the other hand, the compositions of Comparative Examples, which do not contain a cyclic organosilazane compound, exhibit adhesion to only some metals, and the compositions including a hydrolyzable group-containing silicone resin and a polysilazane compound adhere to metals, but do not adhere to polymethylmethacrylate at all.

Japanese Patent Application No. 2020-075977 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:
1. An adhesive composition comprising:
  a cyclic organosilazane compound of the following general formula (1):

wherein R$^1$s each independently represent a substituted or unsubstituted monovalent hydrocarbon group having 1 to 10 carbon atoms, and p represents an integer of 3 to 8; and
  a hydrolyzable group-containing organosilicon compound containing an alkoxysilane compound of the following general formula (2) and/or a partial hydrolytic condensate thereof:

$$R^2_x\text{—Si}(OR^3)_{4-x} \qquad (2)$$

wherein R$^2$ represents an unsubstituted monovalent hydrocarbon group having 1 to 10 carbon atoms or an alkyloxyalkyl group, R$^3$ represents an unsubstituted monovalent hydrocarbon group having 1 to 10 carbon atoms, and x represents an integer of 0 to 2, and
  a solvent, wherein the solvent is an isoparaffin compound or a silicone compound having 2 to 8 silicon atoms.
2. The adhesive composition according to claim 1, further comprising a bisalkoxysilane compound of the following general formula (3) or a partial hydrolytic condensate thereof:

$$R^4_n(OR^5)_{3-n}\text{Si—}R^6\text{—SiR}^4_m(OR^5)_{3-m} \qquad (3)$$

wherein $R^4$ and $R^5$ each independently represent a substituted or unsubstituted monovalent hydrocarbon group having 1 to 10 carbon atoms, $R^6$ represents a substituted or unsubstituted divalent hydrocarbon group having 1 to 50 carbon atoms and optionally containing O, S, N or Si, and n and m each independently represent 0, 1 or 2.

3. The adhesive composition according to claim 1, further comprising at least one metal compound selected from the group consisting of titanium, aluminum, zinc and tin.

4. A cured product obtained by curing the adhesive composition according to claim 1.

5. A covering substrate including a substrate, and a film formed on the substrate, the film being formed from the adhesive composition according to claim 1.

6. The covering substrate according to claim 5, wherein the substrate is an acrylic resin.

* * * * *